(12) United States Patent
Kwack et al.

(10) Patent No.: US 11,304,270 B2
(45) Date of Patent: Apr. 12, 2022

(54) INDUCTION HEATING DEVICE HAVING NEGATIVE VOLTAGE PROTECTION CIRCUIT

(71) Applicant: LG Electronics Inc., Seoul (KR)

(72) Inventors: Younghwan Kwack, Seoul (KR); Seongho Son, Seoul (KR); Jaekyung Yang, Seoul (KR); Yongsoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 325 days.

(21) Appl. No.: 16/678,803

(22) Filed: Nov. 8, 2019

(65) Prior Publication Data

US 2020/0154531 A1 May 14, 2020

(30) Foreign Application Priority Data

Nov. 8, 2018 (KR) .......................... 10-2018-0136320

(51) Int. Cl.
*H05B 6/12* (2006.01)
*H05B 6/06* (2006.01)
*H05B 6/36* (2006.01)
*H05B 1/02* (2006.01)

(52) U.S. Cl.
CPC ............ *H05B 6/36* (2013.01); *H05B 1/0202* (2013.01); *H05B 6/062* (2013.01); *H05B 6/12* (2013.01)

(58) Field of Classification Search
CPC ............ H05B 1/0202; H05B 6/121209; H05B 6/06–065; H05B 6/129; H05B 2206/02–024
See application file for complete search history.

(56) References Cited

FOREIGN PATENT DOCUMENTS

| CN | 107306460 | 10/2017 |
|---|---|---|
| EP | 3001774 | 3/2016 |
| JP | 2014032791 | 2/2014 |
| KR | 20150074065 | 7/2015 |

OTHER PUBLICATIONS

Extended European Search Report in European Application No. 19194342.2, dated Mar. 26, 2020, 5 pages.

*Primary Examiner* — Michael A Laflame, Jr.
(74) *Attorney, Agent, or Firm* — Fish & Richardson P.C.

(57) ABSTRACT

An induction heating device includes a working coil, an inverter including a first switching element and a second switching element; a gate driver including a first sub-gate driver and a second sub-gate driver; and a protection circuit disposed between the inverter and the gate driver. The protection circuit includes a first resistor disposed between a gate terminal of the first switching element and an output terminal of the first sub-gate driver, a second resistor connected electrically in parallel to the first resistor, a protection circuit resistor disposed between a reference voltage terminal of the first sub-gate driver and a first node between the first switching element and the second switching element, a protection circuit diode disposed between a ground and a second node between the protection circuit resistance and the reference voltage terminal, and a bootstrap circuit disposed between the second node and the external power supply.

20 Claims, 16 Drawing Sheets

INDUCTION HEATING DEVICE HAVING NEGATIVE VOLTAGE PROTECTION CIRCUIT

CROSS-REFERENCE TO RELATED APPLICATION

The present disclosure claims priority to and the benefit of Korean Patent Application No. 10-2018-0136320, filed on Nov. 8, 2018, the disclosure of which is incorporated herein by reference in its entirety.

FIELD

The present disclosure relates to an induction heating device that has a negative voltage protection circuit.

BACKGROUND

Various types of cooking utensils may be used to heat food in homes and restaurants. For example, gas ranges may use gas as fuel. In some cases, cooking devices may use electricity instead of gas to heat an object such as a cooking vessel or a pot, for example.

A method of heating an object via electricity may be classified into a resistive heating method and an induction heating method. In the electrical resistive method, heat may be generated based on current flowing through a metal resistance wire or a non-metallic heating element, such as silicon carbide, and may be transmitted to the object through radiation or conduction, to heat the object. In the induction heating method, eddy current may be generated in the object (for example, the cooking vessel) made of metal based on a magnetic field that is generated around the coil when a high-frequency power of a predetermined magnitude is applied to the coil to heat the object.

In some cases, an induction heating device may have a function for detecting whether the object is present on a working coil, namely, a function for detecting a vessel.

For example, FIG. 1 shows an induction heating device that has a function for detecting a vessel in the related art. The induction heating device in the related art will be described with reference to FIG. 1.

FIG. 1 is a schematic view of the induction heating device in the related art.

Referring to FIG. 1, the induction heating device includes a power supply 61, a switching unit 62, a working coil 63, a zero point detector 64, a controller 65, and a current converter 66 in the related art.

Specifically, the power supply 61 may provide the switching unit 62 with direct current (DC), and the switching unit 62 may provide the working coil 63 with resonant current through switching. The zero point detector 64 may detect a zero point of a commercial power supply and transmit a zero-point signal to the controller 65. The current convener 66 may measure the resonance current flowing through the working coil 63 to transmit information on a current fluctuation waveform to the controller 65. The controller 65 may control an operation of the switching unit 62 based on the information on the zero-point signal and the voltage fluctuation waveform received from the zero point detector 64 and the current converter 66, respectively.

In this example, the controller 65 may calculate a voltage value based on the information on the zero-point signal and the voltage fluctuation waveform received from the zero point detector 64 and the current converter 66, respectively. Then, when the voltage value calculated from the controller 65 deviates from a predetermined fluctuation range, the controller 65 may determine that the vessel 70 is not present on the working coil 63.

However, the induction heating device determines whether the vessel 70 is present on the working coil 63 only at a zero time point (that is, a time point at which the input voltage becomes zero voltage) of input voltage (that is, the commercial power supply) in the related art. In such cases, the induction heating device may have a degraded accuracy in the detection of the vessel and have a high power consumption in the related art.

Further, when the input voltage output from the power supply 61 is changed, the accurate detection of the vessel may not be performed by the induction heating device in the related art.

In some cases, in order to implement a function for detecting the vessel, a gate driver may generate an output to control the switching of the switching unit 62 (for example, a turn-on and a turn-off of a switching element provided in the switching unit 62) in real time.

The gate driver may control the switching of the switching unit 62 based on a pulse signal received from the controller 65.

However, in some cases, negative voltage may be applied to the gate driver during the switching of the switching unit 62, which may lead to a damage of the gate driver.

FIG. 2 shows an example of negative voltage applied to the gate driver during the switching of the switching unit in related art.

Specifically, FIG. 2 shows a graph of a voltage change in response to switching of a switching unit provided in an induction heating device in the related art. As shown in FIG. 2, a horizontal axis of the graph is a time t and a vertical axis of the graph is voltage (Vs-Vdd) applied to a reference voltage terminal of the gate driver.

In this example, as shown in FIG. 2, a negative voltage is generated in a freewheeling period FW (that is, a section corresponding to a period of time immediately after time point at which the switching element in a turn-on state is turned off).

In some cases, the gate driver may be protected by insulating an output terminal of a gate driver and a switching unit 62 through a pulse transformer. However, in this case, the turn-on and turn-off times of the switching elements provided in the switching unit 62 may not be controlled in real time.

In some cases, a separate insulating element (for example, an insulating IC) or driving the induction heating device may be used only within a negative voltage tolerance reference or less of the gate driver.

The separate insulating element may by operated by a separate power supply for the individual insulating element, thereby increasing development cost of the induction heating device.

In some cases, when the gate driver (an insulating gate driver) that has high negative voltage tolerance is used, cost of the gate driver may be increased. In many cases, the gate driver that has the high negative voltage tolerance may not have additional function without a separate circuit.

It is of interest to protect the driver from the negative voltage while controlling the turn-on and turn-off of the switching element in real time.

SUMMARY

The present disclosure provides an induction heating device that has an improved function for detecting a vessel.

The present disclosure also provides an induction heating device that has improved control of a switching element in real time and an improved function for negative voltage protection.

The objects of the present disclosure are not limited to the above-mentioned objects, and other objects and advantages of the present disclosure which are not mentioned can be understood by the following description and more clearly understood by the implementations of the present disclosure. It will also be readily apparent that the objects and advantages of the present disclosure may be realized by features described in claims and a combination thereof.

According to one aspect of the subject matter, an induction heating device includes: a working coil; an inverter including a first switching element and a second switching element that are configured to perform a switching operation to thereby apply resonant current to the working coil; a gate driver including a first sub-gate driver and a second sub-gate driver that are configured to be driven based on a drive voltage received from an external power supply, that are connected to the inverter, and that are configured to control the switching operation, the first sub-gate driver and the second sub-gate driver being configured to turn on and turn off the first switching element and the second switching element, respectively; and a protection circuit disposed between the inverter and the gate driver. The protection circuit includes: a first resistor disposed between a gate terminal of the first switching element and an output terminal of the first sub-gate driver, a second resistor connected electrically in parallel to the first resistor, a protection circuit resistor disposed between a reference voltage terminal of the first sub-gate driver and a first node between the first switching element and the second switching element, a protection circuit diode disposed between a ground and a second node between the protection circuit resistance and the reference voltage terminal, and a bootstrap circuit disposed between the second node and the external power supply.

Implementations according to this aspect may include one or more of the following features. For example, the first sub-gate driver may include a first source driver and a first sink driver, and the second sub-gate driver may include a second source driver and a second sink driver. The bootstrap circuit may include a bootstrap capacitor connected to the second node, a bootstrap diode, and a bootstrap resistor. The bootstrap diode and the bootstrap resistor may be disposed between the bootstrap capacitor and the external power supply, and the first source driver may be connected to a third node between the bootstrap capacitor and the bootstrap diode.

In some implementations, the gate terminal of the first switching element may be configured to, based on the bootstrap capacitor being charged by the drive voltage, receive current to turn on the first switching element through the protection circuit resistor, the bootstrap capacitor, the first source driver, and the first resistor in series. In some examples, the protection circuit may be configured to, based on the first switching element being turned on from a state in which the first switching element and the second switching element were turned off, allow current to flow through a composite resistance determined based on resistance values of the first resistor and the protection circuit resistor.

In some implementations, the protection circuit may be configured to, based on the first switching element being turned off from a state in which the first switching element was turned on and the second switching element was turned off, allow current to flow to the ground through the first resistor, the second resistor, the first sink driver, and the protection circuit resistor in series. In some implementations, the protection circuit may be configured to, based on the first switching element being turned off from a state in which the first switching element was turned on and the second switching element was turned off, allow current to flow through a composite resistance determined based on resistance values of the first resistor, the second resistor, and the protection circuit resistor.

In some implementations, the working coil may be configured to, based on the first switching element being turned on from a state in which the first switching element and the second switching element were turned off, be charged with resonance current applied by the first switching element. In some examples, the working coil may be configured to, based on the first switching element being turned off from a state in which the first switching element was turned on and the second switching element was turned on, generate a freewheeling current by a counter electromotive force. The freewheeling current may include: a first portion that flows through a first circuit section comprising the working coil and a diode of the second switching element, and a second portion that flows through a second circuit section comprising the protection circuit resistor and the protection circuit diode.

In some examples, a magnitude of negative voltage applied between the first node and the ground by the freewheeling current may be greater than a magnitude of negative voltage applied between the reference voltage terminal and the ground by the freewheeling current. In some examples, the working coil may be configured to, based on the second switching element being turned on from a state in which the first switching element and the second switching element were turned off, be changed by resonance current that freely resonates and flows through a closed circuit section comprising the working coil and the second switching element.

In some implementations, the induction heating may further include: a sensor configured to measure a value of current in the working coil and a vessel detector. The vessel detector may be configured to: convert a first current value into a first voltage value, the first current value being measured before a resonance of the current in the working coil; compare the first voltage value to a predetermined resonance reference value; control the gate driver to charge the working coil with energy having a predetermined magnitude; convert a second current value into a second voltage value, the second current value being measured after the resonance of the current in the working coil; and compare the second voltage value to a predetermined count reference value to generate an output pulse; and a controller configured to receive the output pulse from the vessel detector and to determine whether a cooking vessel is present on the working coil based on the output pulse received from the vessel detector.

In some examples, the vessel detector may include: a resonance current converter configured to convert the current value measured by the sensor into a voltage value; a shutdown comparator configured to compare the first voltage value to the predetermined resonance reference value to generate an output signal; a latch circuit configured to maintain an activation state of the output signal for a predetermined duration; a count comparator configured to compare the second voltage value to the predetermined count reference value to generate the output pulse; and a shutdown circuit configured to control the gate driver based on the output signal.

In some implementations, the resonance current converter may have a first end connected to the working coil, a second end connected to the shutdown comparator, and a third end connected to the controller. In some examples, each of the first switching element and the second switching element may include an insulated gate bipolar transistor. In some examples, one end of the working coil may be connected to the first node between the first switching element and the second switching element.

In some implementations, wherein the protection circuit resistor may be disposed between and connected to the first node and the second node. In some implementations, the second resistor may include: a first end connected to a node between the first resistor and the output terminal of the gate driver; and a second end connected to a node between the first node and the protection circuit resistor.

In some implementations, the bootstrap resistor may be disposed between and connected to the bootstrap diode and the external power supply. In some examples, the output terminal of the first sub-gate driver may be connected to a node between the first source driver and the first sink driver. In some implementations, the first sink driver may be connected to the reference voltage terminal of the first sub-gate driver.

In some implementations, the induction heating device may have the improved function for detecting the vessel so that the induction heating device operates at lower power consumption compared to the induction heating device in the related art and has a quick response characteristic, thereby preventing waste of power consumption and improving user satisfaction. Further, according to the present disclosure, the induction heating device may accurately detect the vessel regardless of changes in input voltage and prevent overcurrent from flowing through the induction heating device when the function for detecting the vessel is performed, and may prevent noise caused by the overcurrent from occurring.

In some implementations, the induction heating device may have improved control of the switching element in real time and the function for the negative voltage protection without an insulated gate driver or a separate insulating element, thereby making it possible to reduce development cost of the induction heating device and providing ease of design of the induction heating device.

Hereafter, a specific effect of the present disclosure, in addition to the above-mentioned effect, will be described together while describing a specific matter for implementing the present disclosure.

DETAILED DESCRIPTION

The above mentioned objects, features, and advantages of the present disclosure will be described in detail with reference to the accompanying drawings, so that those skilled in the art to which the present disclosure pertains may easily implement the technical idea of the present disclosure.

Hereinafter, according to an implementation of the present disclosure, an induction heating device will be described.

Figure 3:
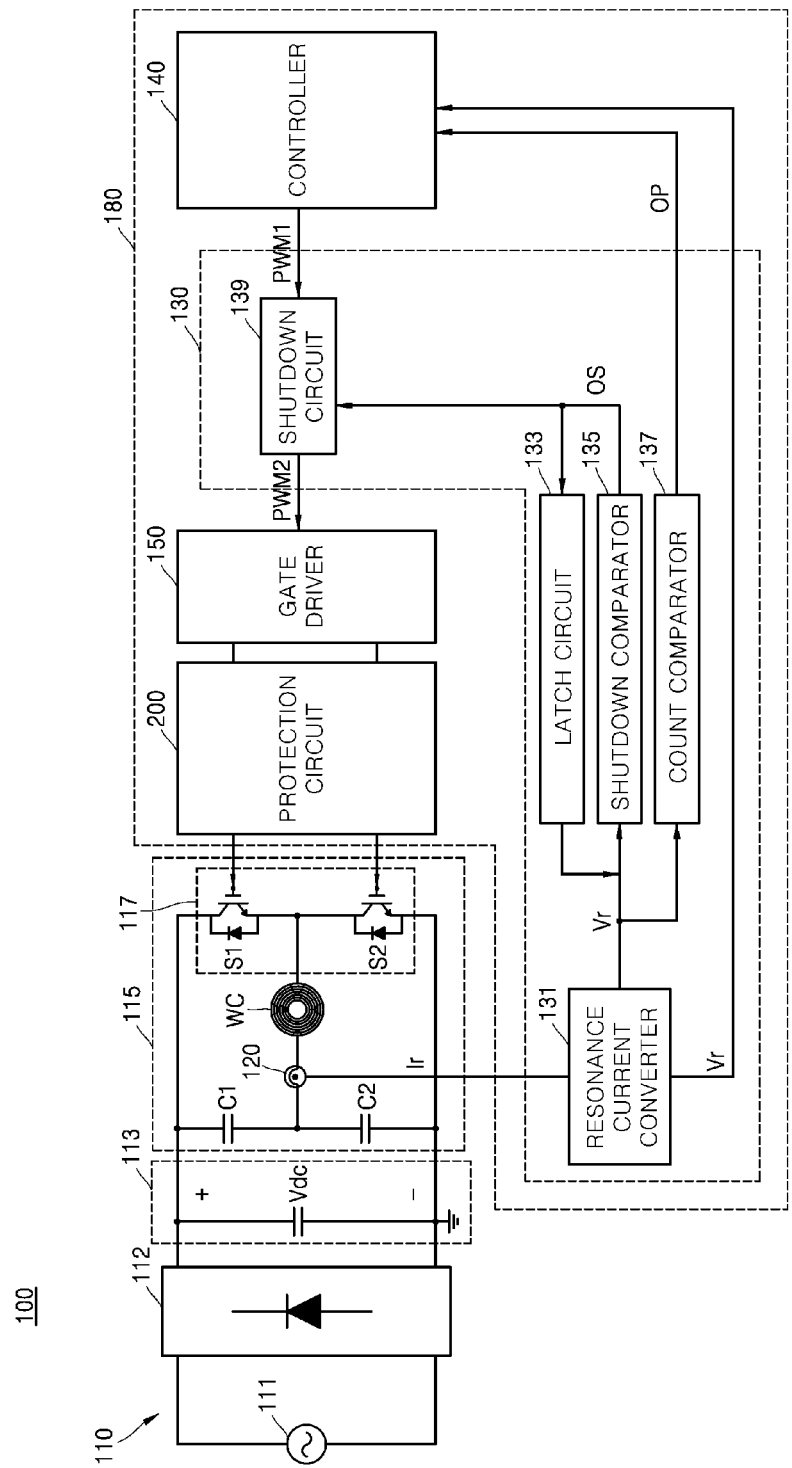
FIG. 3 is a schematic view of an example induction heating device according to the present disclosure.
Figure 4:
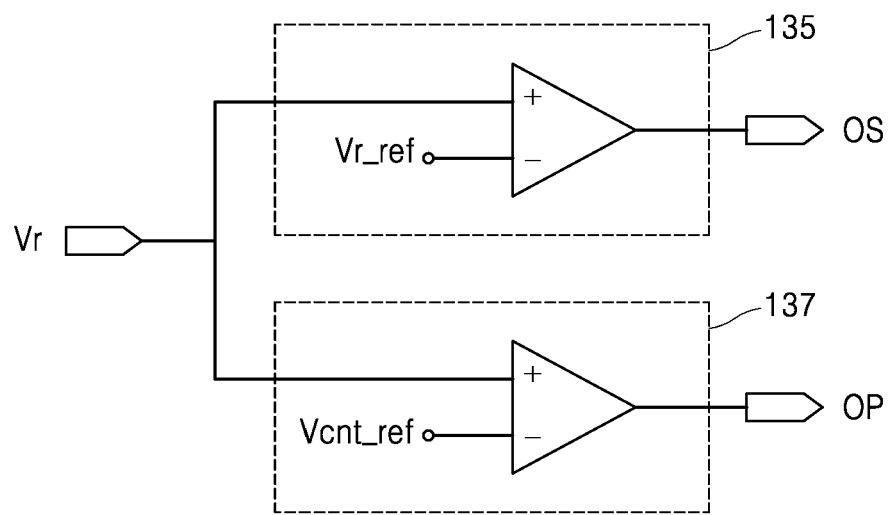
FIG. 4 is a schematic view of an example shutdown comparator and an example count comparator of FIG. 3.

FIG. 3 is a schematic view of an example induction heating device according to an implementation of the present disclosure. FIG. 4 is a schematic view showing an example shutdown comparator and an example count comparator of FIG. 3. In some examples, the induction heating device, the shutdown comparator, and the count comparator may be implemented as electric circuits including various components.

Referring to FIGS. 3 and 4, an induction heating device 100 includes an induction heating circuit 110 that drives a working coil WC, a sensor that measures current flowing through the working coil WC, and a controller 180 that controls an induction heating circuit 110 based on the current measured by the sensor 120.

An induction heating circuit 110 may include a power supply 111, a rectifier 112, a direct current (DC) link capacitor 113, and an induction heater 115.

The power supply 111 may output alternating current (AC) power.

Specifically, the power supply 111 may output the AC power and may provide the rectifier 112 with the AC power and may be, for example, commercial power supply.

The rectifier 112 may convert the AC power received from the power supply 111 into a DC power and supply the DC power to an inverter 117.

Specifically, the rectifier 112 may rectify the AC power received from the power supply 111 and may convert the AC power into the DC power. The rectifier 112 may also provide the DC link capacitor 113 with the DC power converted from the rectifier 112.

In some implementations, the rectifier 112 may include, but is not limited to, a bridge circuit that includes one or more diodes.

The DC link capacitor 113 may receive the DC power from the rectifier 112 and may reduce ripple of the DC power received from the rectifier 112. The DC link capacitor 113 may also include a smoothing capacitor, for example.

In addition, the DC link capacitor 113 receives the DC voltage from the rectifier 112, so that DC voltage Vdc may be applied to both ends of the DC link capacitor 113.

As described above, a DC power (or DC voltage) that is rectified by the rectifier 112 and that has reduced ripple by the DC link capacitor 113 may be supplied to the inverter 117.

The induction heater 115 may drive a working coil WC.

Specifically, the induction heater 115 may include the inverter 117 and a resonance capacitor (that is, C1 and C2).

First, the inverter 117 includes two switching elements S1 and S2. The first and second switching elements S1 and S2 are alternately turned on and off based on a switching signal received from a gate driver 150, so that the DC power is converted into a high frequency of AC (that is, resonant current). Thus, the converted high-frequency of AC may be provided to the working coil WC.

In some implementations, the first and second switching elements S1 and S2 may include, but is not limited to, for example, an insulated gate bipolar transistor (IGBT).

The resonance capacitor may include first and second resonance capacitors C1 and C2 connected in parallel with the first and second switching elements S1 and S2, respectively.

Specifically, when the voltage is applied to the resonance capacitors C1 and C2 based on the switching of the inverter 117, the resonance capacitors C1 and C2 start to resonate. Further, when the resonance capacitors C1 and C2 resonate, the magnitude of the current flowing through the working coil WC connected to the resonance capacitors C1 and C2 is increased.

Through such a process, eddy current is induced into an object located on the working coil WC connected to the resonance capacitors C1 and C2.

In some implementations, the working coil WC may include at least one of, for example, a single coil structure having a single coil, a dual coil structure having an inner coil and an outer coil, and a multi-coil structure having a plurality of coils.

In some examples, the sensor 120 may measure a value Ir of the current flowing through the working coil WC.

Specifically, the sensor 120 may be connected to the working coil WC in series, and may measure the value Ir of the current flowing through the working coil WC.

In some implementations, the sensor 120 may include, for example, a current measuring sensor that directly measures the current value, and may include a current transformer.

When the sensor 120 includes the current measuring sensor, the sensor 120 may directly measure the value Ir of the current flowing through the working coil WC and may provide a resonance current converter 131 described below with the measured current value Ir. In some implementations, when the sensor 120 includes the current transformer, the sensor 120 may convert a magnitude of the current flowing through the working coil WC by the current transformer to provide the resonance current converter 131 with the current in which the magnitude thereof is changed.

However, for convenience of explanation, in the implementation of the present disclosure, the sensor 120 includes the current measuring sensor that directly measures the value of the current Ir flowing through the working coil WC.

A controller 180 may include a vessel detector 130, a controller 140, a gate driver 150, and a protection circuit 200.

First, the vessel detector 130 determines a state of a second pulse signal PWM2 (particularly, PWM2-HIN of FIG. 5) provided to the gate driver 150 based on the value of the current measured by the sensor 120.

Further, the vessel detector 130 may include a resonant current converter 131, a latch circuit 133, a shutdown comparator 135, a count comparator 137, and a shutdown circuit 139.

Specifically, the resonance current converter 131 may convert the value Ir of the current measured by the sensor 120 into a voltage value Vr. The resonance current converter 131 may also transmit the information on the converted voltage value Vr to the shutdown comparator 135, the count comparator 137, and the controller 140, respectively.

That is, the resonance current converter 131 may convert the value Ir of the current received from the sensor 120 into the voltage value Vr and may transmit the information on the converted voltage value Vr to the shutdown comparator 135, the count comparator 137 and the controller 140, respectively.

The voltage value, provided by the resonance current converter 131, to the shutdown comparator 135 is different from the voltage value, provided by the resonance current converter 131, to the count comparator 137, and the details thereof will be described below.

In some implementations, in the implementation of the present disclosure, the resonance current converter 131 is not necessary and may be omitted. In this case, the information on the value Ir of the current measured by the sensor 10 may be transmitted to the shutdown comparator 135, the count comparator 137, and the controller 140.

However, for convenience of explanation, in the implementation of the present disclosure, the induction heating device 100 includes the resonance current converter 131.

The shutdown comparator 135 compares whether the voltage value Vr received from the resonance current converter 131 is greater than a predetermined resonance reference value Vr_ref.

Specifically, the shutdown comparator 135 may compare the voltage value Vr received from the resonance current converter 131 with a predetermined resonance reference value Vr_ref.

That is, the shutdown comparator 135 may activate an output signal OS when the voltage value Vr received from the resonance current converter 131 is greater than the predetermined resonance reference value Vr_ref. The shutdown comparator 135 may deactivate the output signal OS when the voltage value Vr received from the resonance current converter 131 is less than a predetermined resonance reference value Vr_ref.

In some examples, activating the output signal OS may include outputting the output signal OS at a high level (for example, '1'). Deactivating the output signal OS may include outputting the output signal OS at a low level (for example, '0').

The output signal OS of this shutdown comparator 135 may be provided to the shutdown circuit 139.

A state of the second pulse signal PWM2 (particularly, PWM2-HIN of FIG. 5) output from the shutdown circuit 139 is determined depending on the activation or the deactivation of the output signal OS, and details thereof will be described below.

A latch circuit 133 may maintain the activation state of the output signal OS output from the shutdown comparator 135 for a predetermined time.

Specifically, when the output signal OS of the shutdown comparator 135 is activated, the latch circuit 133 may maintain an activation state of the output signal OS output from the shutdown comparator 135 for a predetermined period of time.

The count comparator 137 may compare whether the voltage value Vr received from the resonance current converter 131 is greater than a predetermined count reference value Vcnt_ref and may output the output pulse OP based on a result of the comparison.

Specifically, when the voltage value Vr received from the resonance current converter 131 is greater than a predetermined count reference value Vcnt_ref, the count comparator 137 may output the output pulse OP in an on-state. When the voltage value Vr received from the resonance current converter 131 is less than the predetermined count reference value Vcnt_ref, the count comparator 137 may output the output pulse OP in an off-state.

The output pulse OP in the on-state has a logical value of '1' and the output pulse OP in the off-state has a logical value of '0'.

Accordingly, the output pulse OP output from the count comparator 137 may have a form of a square wave in which the on-state and the off-state are repeated.

In some implementations, the output pulse OP output from the count comparator 137 may be provided to the controller 140.

Accordingly, the controller 140 may determine whether the object is present on the working coil WC based on count and on-duty time of the output pulse OP received from the count comparator 137.

The shutdown circuit 139 may provide the gate driver 150 with the second pulse signal PWM2 for detecting the vessel.

Specifically, the shutdown circuit 139 may provide the gate driver 150 with the second pulse signal PWM2, and the gate driver 150 may turn on or turn off the first and second switching elements S1 and S2 in the inverter 117 in a complementary manner based on the second pulse signal PWM2.

The second pulse signal PWM2 may include a signal PWM2-HIN (see FIG. 5) to control a turn-on or a turn-off of the first switching element S1 and a signal PWM2-LIN (see FIG. 5) to control a turn-on or a turn-off of the second switching element S2.

In some implementations, the state of the second pulse signal PWM2, (particularly PWM2-HIN of FIG. 5) of the shutdown circuit 139 may be determined depending on the activation or the deactivation of the output signal OS received from the shutdown comparator 135.

Specifically, when the output signal OS is activated, the shutdown circuit 139 may provide the gate driver 150 with the second pulse signal of the off-state (that is, PWM2-HIN of a low level (logical value of '0')).

That is, the shutdown circuit 139 may provide the gate driver 150 with the second pulse signal (that is, PWM2-HIN of FIG. 5) in the off-state so that the first switching element S1 is turned off.

When the output signal OS is deactivated, the shutdown circuit 139 may provide the gate driver 150 with the second pulse signal of the on-state (that is, PWM2-HIN of the high level) (a logical value of '1').

That is, the shutdown circuit 139 may provide the gate driver 150 with the second pulse signal in the on-state (that is, PWM2-HIN of FIG. 5) so that the first switching element S1 is turned on.

The controller 140 may control the shutdown circuit 139 and the gate driver 150.

Specifically, the controller 140 may control the gate driver 150 by providing the shutdown circuit 139 with the first pulse signal PWM1.

Further, the controller 140 may receive the output pulse OP from the count comparator 137.

Specifically, the controller 140 may determine whether the object is present on the working coil WC based on the count or the on-duty time of the output pulse OP received from the count comparator 137.

The count may refer to a number of times at which the state of the output pulse OP is changed from the off-state to the on-state. The on-duty time may refer to an accumulated time at which the output pulse OP is in the on-state during a period of time (that is, D3 of FIG. 5) during which free resonance of resonance current occurs in a section where current flows including the working coil WC and the second switching element S2.

Further, when it is determined that the object is present on the working coil WC, the controller 140 controls the gate driver 150 to activate the working coil WC. Further, the controller 140 may enable displaying the detection of the object through a display or an input interface or may notify the user of the detection of the object through notification sound.

Figure 5:
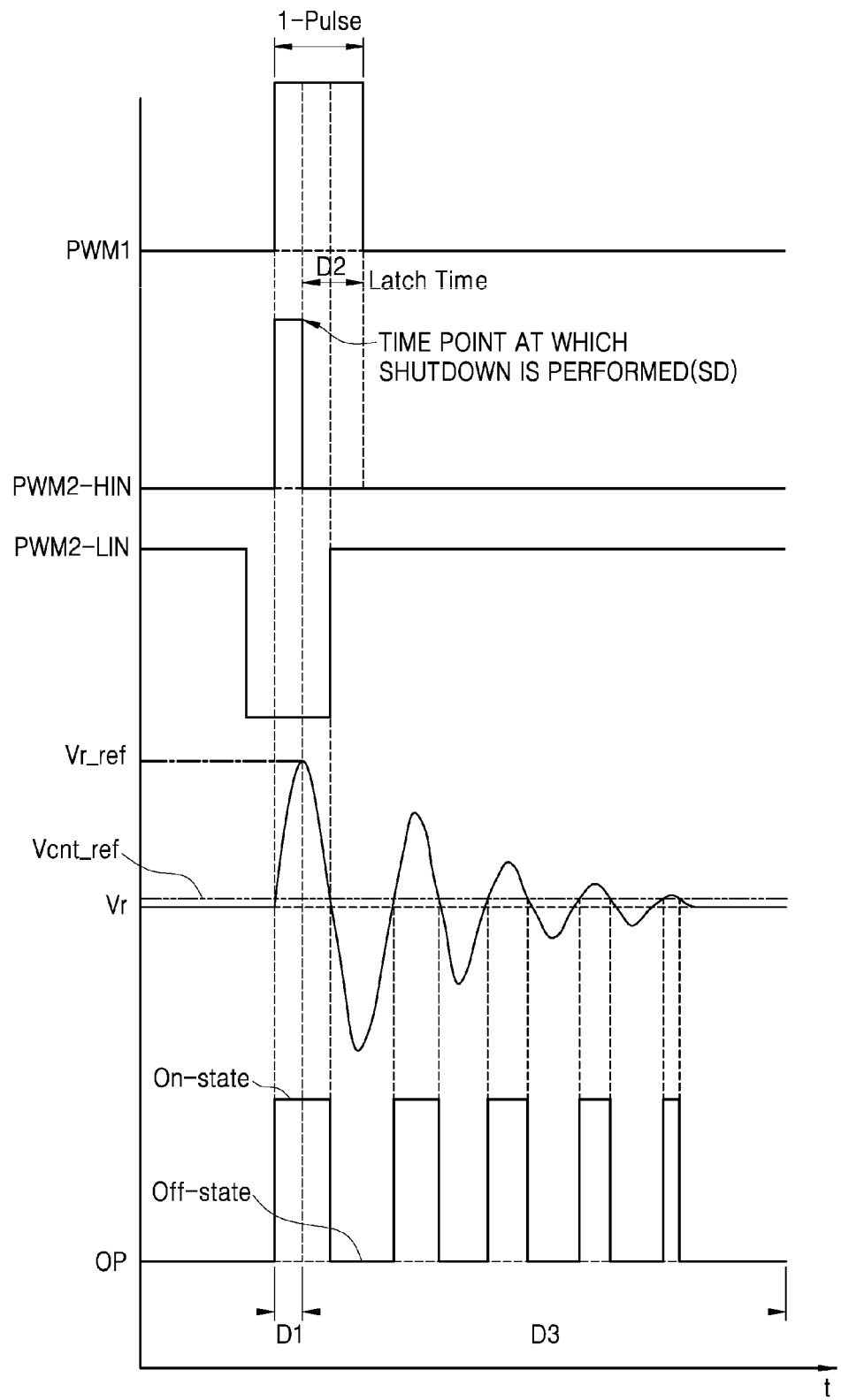
FIG. 5 is a graph of an example method for detecting a vessel by the induction heating device of FIG. 3.

In some implementations, the controller 140 may include, but is not limited to, a micro controller that outputs a first pulse signal PWM1 (i.e., a single pulse (1-pulse) of FIG. 5) of a predetermined size.

The gate driver 150 may be driven based on drive voltage, of the driver, received from an external power supply (i.e., a component 250 of FIG. 10), and may be connected to the inverter 117 to control the switching of the inverter 117.

Further, the gate driver 150 may control the inverter 117 based on the second pulse signal PWM2 received from the shutdown circuit 139. That is, the gate driver 150 may turn on or off the first and second switching elements S1 and S2 the inverter 117 includes based on the second pulse signal PWM2.

In some implementations, the gate driver 150 includes first and second sub-gate drivers 155 and 160 (see FIG. 11) to turn on or off the first and second switching elements S1 and S2, respectively, and details thereof will be described below.

The protection circuit 200 may be provided between the inverter 117 and the gate driver 150.

Specifically, the protection circuit 200 enables minimizing negative voltage that may be applied to the gate driver 150 during the switching of the inverter 117, and details thereof will be described below.

Hereinafter, a method for detecting a vessel of the induction heating device of FIG. 3 will be described with reference to FIGS. 5 to 7.

FIG. 5 is a graph corresponding to an example method for detecting a vessel of the induction heating device of FIG. 3. FIGS. 6 and 7 show example circuit states corresponding to an example method for detecting a vessel of the induction heating device of FIG. 3.

Figure 6:
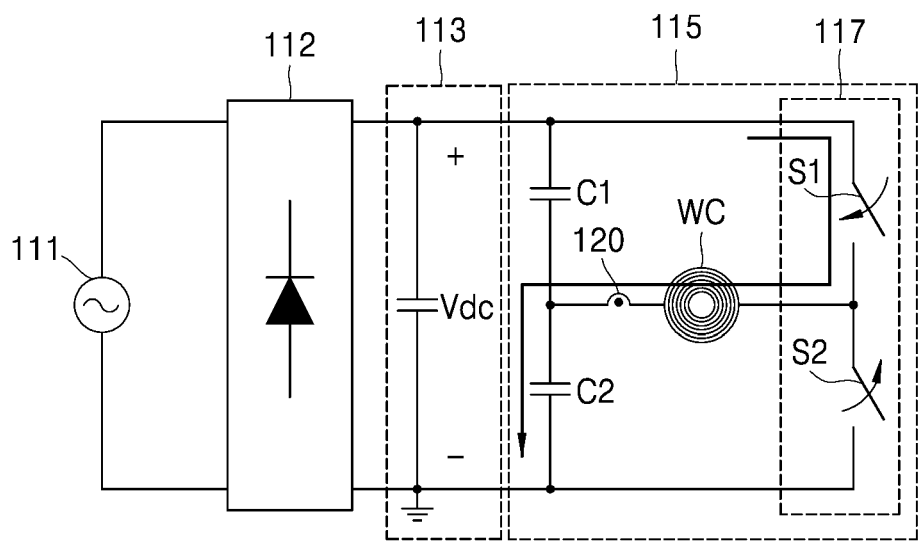
FIGS. 6 and 7 show an example method for detecting a vessel by the induction heating device of FIG. 3.
Figure 7:
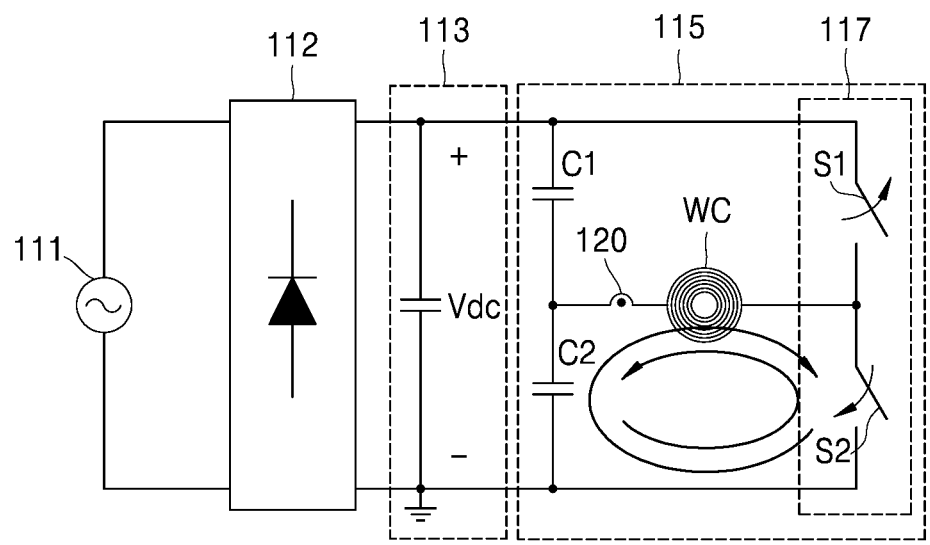

In some implementations, the above-described controller 180 is omitted from FIGS. 6 and 7 for convenience of explanation.

Referring to FIGS. 3 and 5 to 7, the controller 140 provides a shutdown circuit 139 with a first pulse signal PWM1. At this time, the controller 140 may provide the shutdown circuit 139 with a single pulse (1-pulse).

The shutdown circuit 139 transmits the single pulse (1-pulse) received from the controller 140 to the gate driver 150.

As shown in FIGS. 5 and 6, a gate driver 150 turns on the first switching element S1 and turns off the second switching element S2 while the single pulse (1-pulse) is input to the gate driver 150, from the shutdown circuit 139.

In this process, the DC link capacitor 113 and the working coil WC to which the DC voltage Vdc is applied form a section in which the current flows, and energy of the DC voltage Vdc is transmitted to the working coil WC so that current passing through the working coil WC flows through the section in which the current flows.

The sensor 120 measures the value Ir of the current passing through the working coil WC and transmits the information on the measured current value Ir to the resonance current converter 131. The resonance current converter 131 converts the measured current value Ir (current value obtained before the resonance current freely resonates) into a voltage value Vr (that is, a first voltage value), and provides a shutdown comparator 135 with the information on the converted voltage value Vr.

The shutdown comparator 135 compares the voltage value Vr received from the resonance current converter 131 with a predetermined resonance reference value Vr_ref.

When the supplied voltage value Vr is greater than the predetermined resonance reference value Vr_ref, the shutdown comparator 135 provides the shutdown circuit 139 with the activated output signal OS. A time point at which the shutdown circuit 139 receives the activated output signal OS from the shutdown comparator 135 corresponds to a time point at which the shutdown is performed SD.

That is, the working coil WC is charged with energy by the DC voltage Vdc for a period of time of D1. Then, when the working coil WC is sufficiently charged with the energy and the working coil WC has an energy level exceeding a predetermined threshold value (that is, the resonance reference value Vr_ref), the shutdown circuit 139 provides the gate driver 150 with the second pulse signal (PWM2; that is, PWM2-HIN) in the off-state so that the working coil WC is not charged with the energy.

Accordingly, the shutdown circuit 139 may control the gate driver 150 to store a predetermined amount of energy in the working coil WC. Further, as the free resonance of the resonance current constantly occurs in the section in which the current flows including the working coil WC and the second switching element S2, thereby improving accuracy and reliability in the function for detecting the vessel.

In addition, after a time point at which the shutdown is performed SD, the latch circuit 133 maintains the activated state of the output signal OS of the shutdown comparator 135 for a predetermined period of time D2 (i.e., a latch time) to prevent the output signal OS activated during the input, of the first pulse signal PWM1, to the shutdown circuit 139 from being deactivated.

Accordingly, when the output signal OS of the shutdown comparator 135 is activated once, the output signal OS of the shutdown comparator 135 may maintain an activated state for a predetermined period of time. Therefore, the shutdown circuit 139 may maintain the second pulse signal PWM2-HIN associated with the first switching element S1 in an off-state while the output signal OS is activated.

In some implementations, when the output signal OS is activated and the gate driver 150 is provided with the second pulse signal PWM2 (that is, PWM2-HIN) in an off-state, the first switching element S1 is turned off so that the working coil WC may not be charged with the voltage (that is, energy). However, even if the first switching element S1 is turned off at the time point when the shutdown is performed SD, the voltage applied to the working coil WC may be slightly increased beyond the predetermined resonance reference value Vr_ref after the time point at which the shutdown is performed SD and then decreases again.

At this time, when the voltage provided to the working coil WC falls to or below a predetermined resonance reference value Vr_ref, the shutdown comparator 135 may receive the voltage value Vr_ref less than the predetermined resonance reference value Vr_ref from the resonance current converter 131, and may deactivate the output signal OS. In this case, the first switching element S1 may be turned on again, while the shutdown circuit 139 provides the gate driver 150 with the second pulse signal PWM2 (that is, PWM2-HIN) in the on-state. As a result, the working coil WC that has already charged with the energy may be further charged with unnecessary energy. In order to solve this problem, the latch circuit 133 maintains the activation state of the output signal OS of the shutdown comparator 135 for a predetermined period of time D2 (i.e., a latch time) after the time point at which the shutdown is performed SD.

Referring to FIGS. 5 and 7, the shutdown circuit 139 turns off the first switching element S1 and turns on the second switching element S2 after the time point at which the shutdown is performed SD so that the working coil WC, the second capacitor C2, and the second switching element S2 form the section through which the current flows.

After the section flows the current, the working coil WC may exchange the energy with the capacitor C2, and the resonant current resonates freely and flows in the section in which the current flows.

When the object is not present on the working coil WC, an amplitude of the resonant current may be reduced due to a resistance of the working coil WC.

When the object is present on the working coil WC, the amplitude of the resonant current may be reduced due to the resistance of the working coil WC and the resistance of the object (that is, a significant magnitude of the amplitude of the resonance current is reduced compared to a case in which the object is not present on the working coil WC).

Then, the sensor 120 measures the value Ir of the current that resonates freely in the section in which the current flows, and provides the resonance current converter 131 with the information on the measured current value Ir. The resonance current converter 131 converts the current value Ir (i.e., the current value measured after the resonance current freely resonates) into a voltage value Vr (i.e., a second voltage value), and provides the count comparator 137 and the controller 140 with the information on the converted voltage value Vr, respectively.

In some implementations, as the working coil WC has the constant resistance value, the voltage of the working coil WC has a waveform substantially equal to the current of the working coil WC.

Subsequently, the count comparator 137 compares the voltage value Vr with the count reference value Vcnt_ref, and generates the output pulse OP based on the result of the comparison. The count comparator 137 also provides the controller 140 with the output pulse OP.

The output pulse OP has an on-state when the voltage value Vr is greater than the count reference value Vcnt_ref and an off-state when the voltage value Vr is less than the count reference value Vcnt_ref.

The controller 140 determines whether the object is present on the working coil WC based on the output pulse OP received from the count comparator 137.

In some examples, when the count of the output pulse OP is less than a predetermined reference count, the controller 140 may determine that the object is present on the working coil WC. When the count of the output pulse OP is greater than a predetermined reference count, the controller 140 may determine that the object is not present on the working coil WC. The count may refer to a number of times at which the state of the output pulse OP is changed from the off-state to the on-state.

In some examples, when the on-duty time of the output pulse OP is less than a predetermined reference time, the controller 140 may determine that the object is present on the working coil WC. When the on-duty time of the output pulse OP is greater than the predetermined reference time, the controller 140 may determine that the object is not present on the working coil WC. The on-duty time may refer to an accumulated time at which the output pulse OP is in the on-state during the period of time after the time point at which the shutdown is performed SD (i.e., D3 in FIG. 5).

That is, the controller 140 may accurately determine whether the object is present on the working coil based on the count or the on-duty time of the output pulse OP.

Then, the controller 140 activates the working coil WC based on the determination whether the object is present on the working coil WC. Further, the controller 140 may display the information on the detection of the object through the display or the interface or generate the notification sound to notify the user of the detection of the object.

Figure 8A:
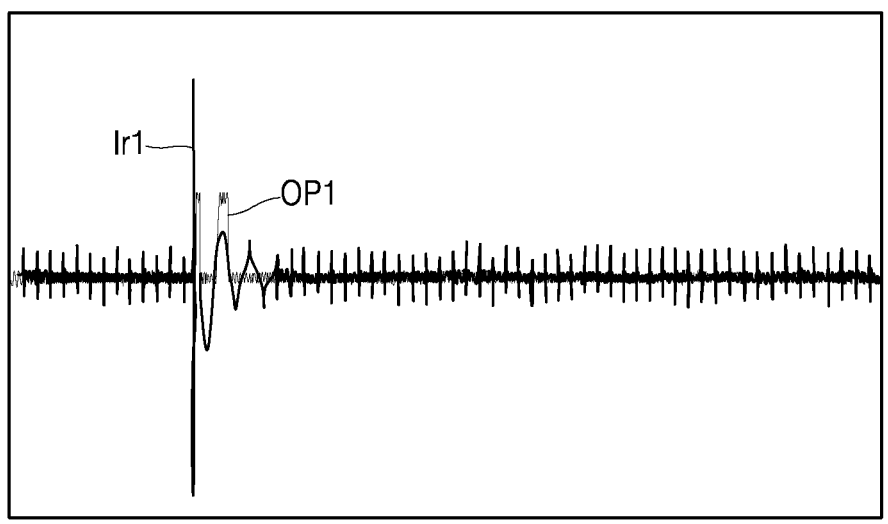
FIG. 8A and FIG. 8B are graphs of example waveforms used in determining whether an object is present in the induction heating device of FIG. 3.
Figure 8B:
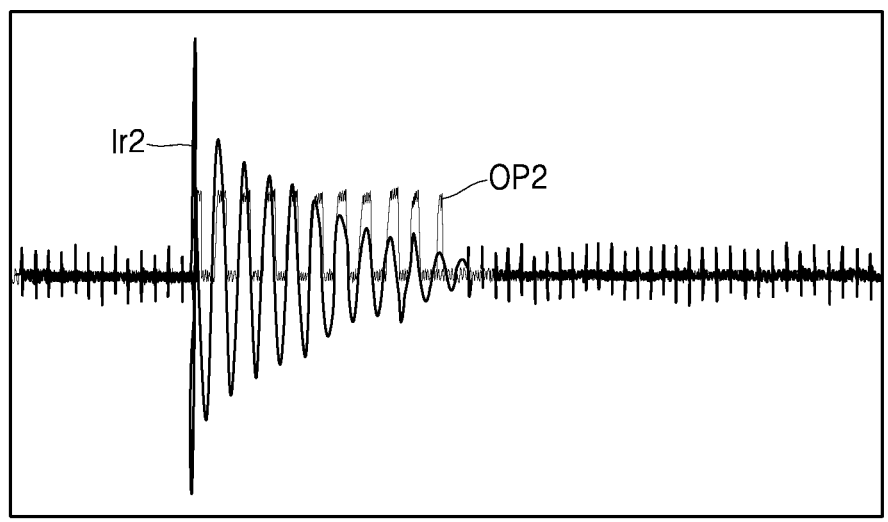

FIG. 8A and FIG. 8B are graphs of example waveforms used in determining whether an object is present, in the induction heating device of FIG. 3.

FIG. 8A is an example waveform generated when the object is present on a working coil WC. FIG. 8B is an example waveform generated when the object is not present on the working coil WC. In some implementations, FIGS. 8A and 8B are only one experimental example, and the implementation of the present disclosure is not limited to the experimental example of FIG. 8.

FIG. 8A shows a first resonance current Ir1 flowing through the working coil WC and a first output pulse OP1 for first resonance current Ir1. Further, FIG. 8B shows a second resonance current Ir2 flowing through the working coil WC and a second output pulse OP2 for the second resonance current Ir2.

Referring to the graph, FIG. 8A shows that a count of the first output pulse OP is twice, and FIG. 8B shows a count of the second output pulse OP2 is 11 times. That is, the count is relatively less when the object is present on the working coil WC, while the count is relatively greater when the object is not present on the working coil WC.

Therefore, a reference count for determining whether the object is present on the working coil WC may be determined as a value between the count of FIG. 8A and the count of FIG. 8B. Further, the controller 140 may determine whether the object is present on the working coil WC based on a predetermined reference count.

Further, the on-duty time of the first output pulse OP1 as shown in FIG. 8A may be shorter than the on-duty time of the second output pulse OP2 as shown in FIG. 8B. That is, when the object is present on the working coil WC, the on-duty time is relatively short while the on-duty time is relatively long when the object is not present on the working coil WC.

Therefore, a reference time for determining whether the object is present on the working coil WC may be determined as a value corresponding to a time between the on-duty time of FIG. 8A and the on-duty time of FIG. 8B. Further, the controller 140 may determine whether the object is present on the working coil WC based on a predetermined reference time.

That is, the controller 140 may improve accuracy in the determination as to whether the object is present on the working coil WC based on at least one of the count and the on-duty time of an output pulse OP.

Figure 9:
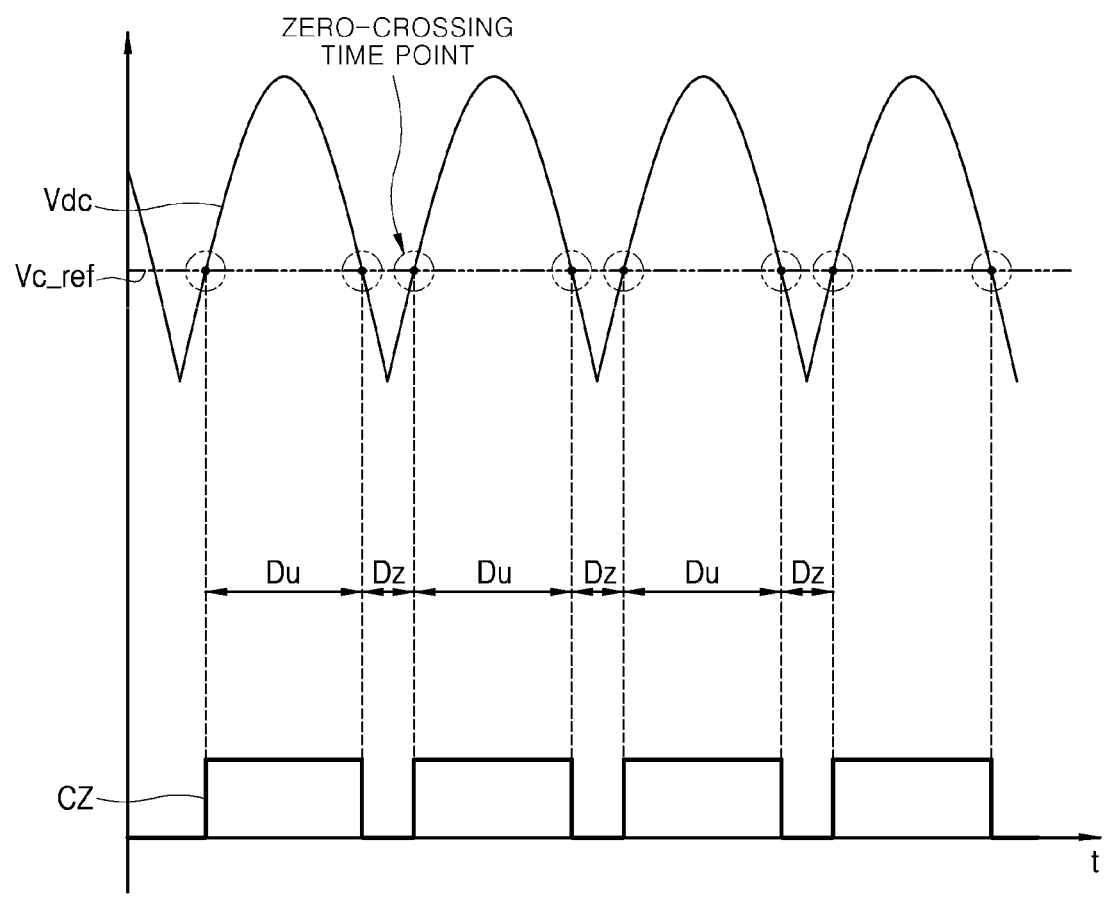
FIG. 9 is a graph showing example zero crossing time points of input voltage applied to the induction heater of FIG. 3.

FIG. 9 is a graph showing example zero crossing time points of a DC voltage applied to the induction heater of FIG. 3.

FIG. 9 shows rectified DC voltage Vdc and a zero voltage detection waveform CZ for the DC voltage Vdc.

Referring to FIG. 9, the DC voltage Vdc has a half wave rectified waveform through a rectifying operation of a rectifier 112. For example, the DC voltage Vdc may have a half wave rectified waveform that fluctuates around about 150V.

A time point at which the DC voltage Vdc becomes equal to a predetermined reference voltage Vc_ref is referred to as "a zero-crossing time point" (i.e., zero voltage time point).

The DC voltage Vdc is classified into a first section Dz in which the DC voltage Vdc is less than a predetermined reference voltage Vc_ref and a second section Du in which the DC voltage Vdc is greater than a predetermined reference voltage Vc_ref based on the zero-crossing time point.

A fluctuation amount of the DC voltage Vdc in the first section Dz is relatively less than the fluctuation amount of the DC voltage Vdc in the second section Du, such that the controller 140 may perform the detection of the vessel relatively stable in the first section Dz.

Accordingly, the controller 140 performs the operation of detecting the vessel only in the first section Dz in which the DC voltage Vdc is less than the reference voltage Vc_ref.

The controller 140 may detect the zero crossing time point of the DC voltage Vdc and may determine whether the object is present on the working coil WC in the section in which the DC voltage Vdc is less than the reference voltage Vc_ref based on the zero-crossing time point.

Accordingly, according to the implementation of the present disclosure, the induction heating device 100 may perform the operation of detecting the vessel only in the first section Dz, thereby improving the accuracy and the reliability in the detection of the vessel by the induction heating device 100.

As described above, according to the implementation of the present disclosure, the operation of detecting the vessel is performed by the induction heating device 100. Hereinafter, as shown in FIG. 3, the configurations of the protection circuit 200 and the gate driver 150 of the induction heating device 100 will be described with reference to FIGS. 10 and 11.

Figure 10:
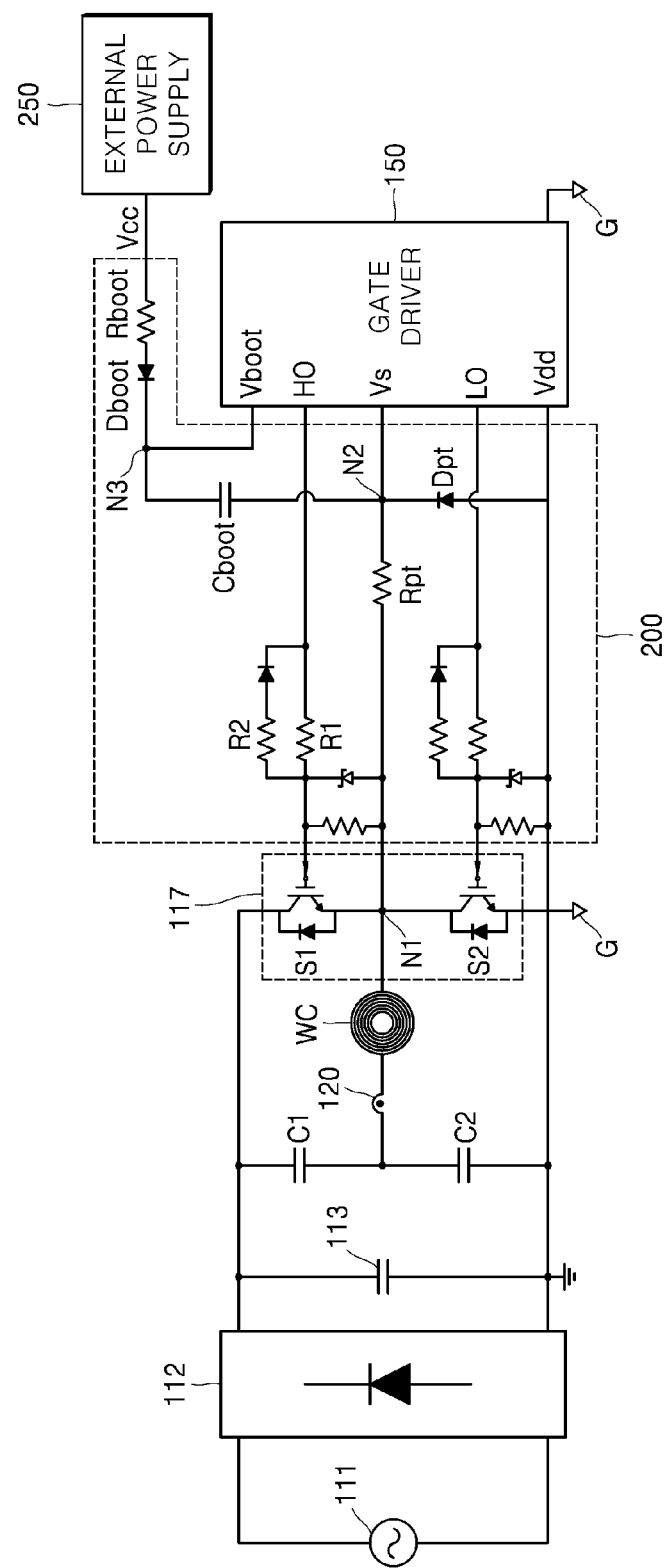
FIG. 10 shows an example circuit diagram of a protection circuit of the induction heating device of FIG. 3.
Figure 11:
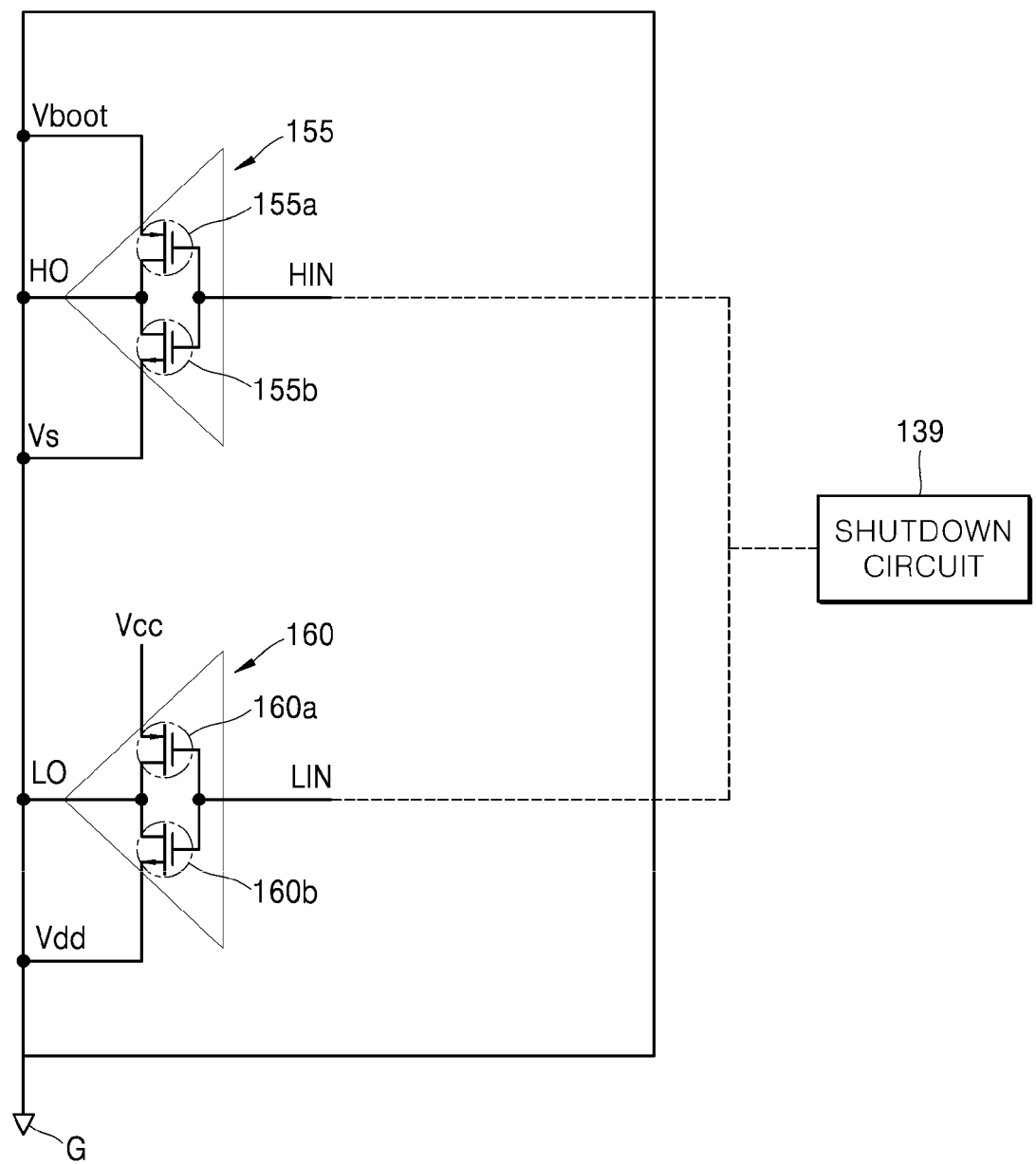
FIG. 11 shows an example circuit diagram of the gate driver of FIG. 10.

FIG. 10 is an example circuit diagram of a protection circuit of an induction heating device of FIG. 3. FIG. 11 is an example circuit diagram of a gate driver of FIG. 10.

Referring to FIGS. 10 and 11, a protection circuit 200 may be provided between an inverter 117 and a gate driver 150.

Specifically, the protection circuit 200 may include a first resistor R1 provided between a gate terminal of a first switching element S1 and an output terminal HO of a first sub-gate driver 155, a second resistor R2 that is connected in parallel with the first resistance R1, and a protection circuit resistance Rpt provided between the first node N1 between the first and second switching elements S1 and S2 and a reference voltage terminal Vs of the first sub-gate driver 155. For example, the second resistor R2 includes a first end connected to a node between the first resistor R1 and the output terminal HO of the first sub-gate driver 155, and a second end connected to a node between the first node N1 and the protection circuit resistor Rpt.

The protection circuit 200 may further include a protection circuit diode Dpt between a ground G and a second node N2 between the protection circuit resistance Rpt and a reference voltage terminal Vs, and a bootstrap circuit provided between the second node N and an external power supply 250.

The bootstrap circuit may include a bootstrap capacitor Cboot connected to the second node N2, a bootstrap diode Dboot and a bootstrap resistor Rboot provided between the bootstrap capacitor Cboot and the external power supply 250. Further, the bootstrap diode (Dboot) and the bootstrap resistor (Rboot) may also be connected in series.

In some implementations, a resistance value of the protection circuit resistance Rpt and a resistance value of the bootstrap resistor Rboot may be determined within a range in which an initial voltage value obtained according to the following formula does not exceed a gate threshold voltage value (that is, gate threshold voltage) of a switching element (for example, S1 or S2).

$$\text{Initial voltage value} = Vcc \times (Rpt/(Rboot+Rpt)) \quad \text{<Formula>}$$

That is, the voltage Vcc output from the external power supply 250 may be provided to an emitter (or source) of a first source driver 155a described below through the bootstrap resistance Rboot and a bootstrap diode (Dboot) through the configuration of the protection circuit 200. The bootstrap voltage (Vboot) may be provided to the emitter (or the source) of the first source driver 155a. Voltage Vcc output from the external power supply 250 may be provided to the emitter (or the source) of the second source driver 160a described below and the emitter (or the source) of a second sink driver 160b may be connected to the ground G.

In some implementations, the negative voltage applied to the gate driver 150 is minimized by the protection circuit resistance Rpt and the protection circuit diode Dpt of the configurations of the protection circuit 200 described above and details thereof is described below.

In some examples, the gate driver 150 may include first and second sub-gate drivers 155 and 160 that turn on or off the first and second switching elements S1 and S2, respectively.

Specifically, the first sub-gate driver 155 receives the pulse signal HIN (that is, PWM2-HIN in FIG. 5) related to the first switching element S1 from a shutdown circuit 139. The second sub-gate driver 160 may receive the pulse signal LIN (that is, PWM2-LIN of FIG. 5) related to the second switching element S2 from the shutdown circuit 139.

The first sub-gate driver 155 may include a first source driver 155a and a first sink driver 155b and the second sub-gate driver 160 may include a second source driver 160a and a second sink driver 155b.

When the first and second sub-gate drivers 155 and 160 include a bipolar junction transistor (BJT), respectively, the first and second source drivers 155a and 160a include pnp transistors, respectively, and the first and second sink drivers 155b and 160b may include npn transistors, respectively.

In some examples, when the first and second sub-gate drivers 155 and 160 include a metal oxide semiconductor field effect transistor (MOSFET), the first and second source drivers 155a and 160a may include a P-MOSFET (i.e., a p-type MOSFET), respectively, and the first and second sink drivers 155b and 160b may include an N-MOSFET (i.e., an n-type MOSFET).

The first source driver 155a and the first sink driver 155b provided in the first sub-gate driver 155 may be driven (that is, turned on or turned off) based on the pulse signal HIN received from the shutdown circuit 139 in a complementary manner.

In some implementations, the second source driver 160a and the second sink driver 160b provided in the second sub-gate driver 160 may be driven (that is, turned on or turned off) based on the pulse signal LIN received from the shutdown circuit 139.

That is, when the first source driver 155a is turned on, the first sink driver 155b may be turned off, and when the second source driver 160a is turned on, the second sink driver 160b may be turned off.

In some implementations, when the first source driver 155a is turned off, and the first sink driver 155b is turned on and the second source driver 160a is turned off, the second sink driver 160b may be turned.

The first source driver 155a may be connected to the third node N3 between the bootstrap capacitor Cboot and the bootstrap diode Dboot and the second sink driver 160b may be connected to the ground G.

More specifically, the emitter (or the source) of the first source driver 155a may be connected to the third node N3 and a collector (or a drain) of the first source driver 155a may be connected to an output terminal HO of the first sub-gate driver 155.

Further, the collector (or the drain) of the first sink driver 155b may be connected to the output terminal HO of the first sub-gate driver 155 and the emitter (or the source) of the first sink driver 155b may be connected a reference voltage terminal Vs of the first sub-gate driver 155.

The emitter (or the source) of the second source driver 160a may be connected to the external power supply 250 and the collector (or the drain) of the second source driver 160a may be connected to an output terminal LO of the second sub-gate driver 160.

The collector (or the drain) of the second sink driver 160b may be connected to the output LO of the second sub-gate driver 160 and the emitter (or the source) of the second sink driver 160b may be connected to the ground G (In some implementations, Vdd is connected to the G).

As described above, as shown in FIG. 3 the induction heating device 100 includes the protection circuit 200 and the gate driver 150. Hereinafter, as shown in FIG. 10, current flow changed depending on the switching of the inverter 117 will be described with reference to FIGS. 12 to 15.

Figure 12:
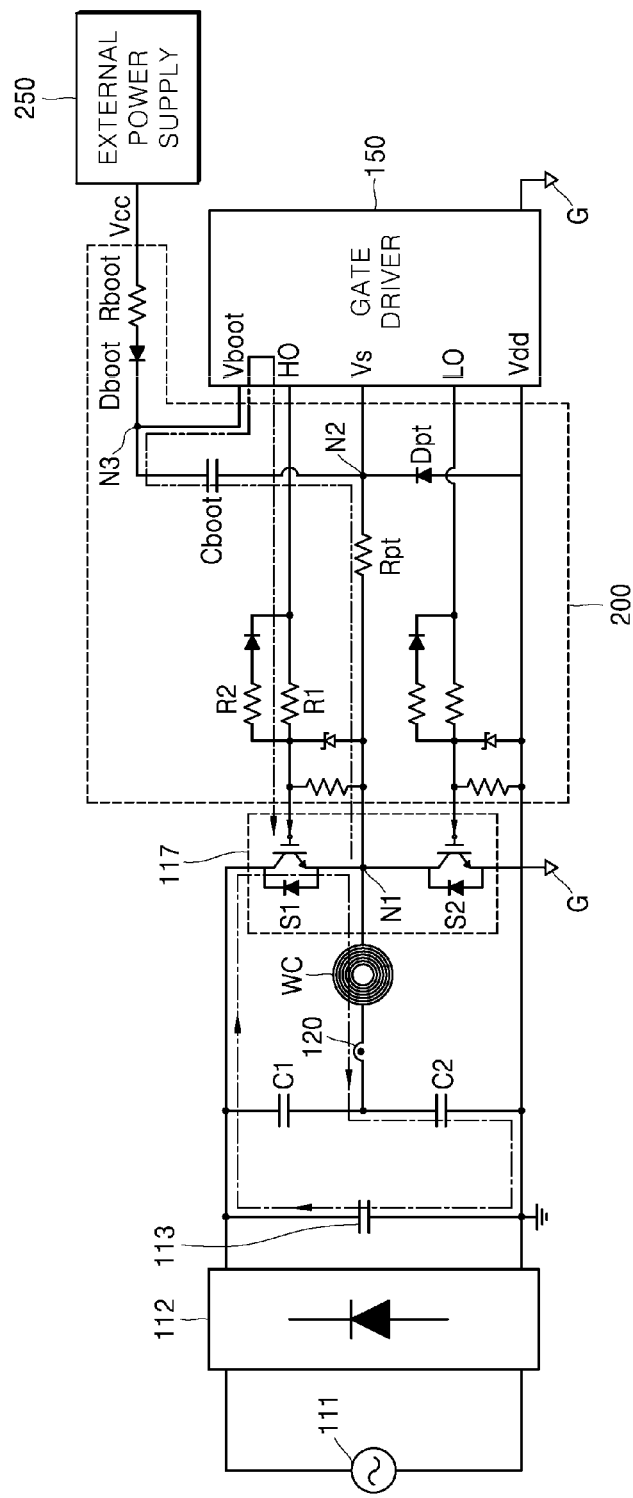
FIGS. 12 to 15 show examples of current flow changes based on a switching operation of the inverter of FIG. 10.

First, FIGS. 11 and 12 show that the current flows generated when the first switching element S1 is turned on with the first and second switching elements S1 and S2 being turned off. For instance, the first switching element S1 is being turned on from a state in which the first switching element S1 and the second switching element S2 were turned off.

Specifically, when the first sub-gate driver 155 receives the pulse signal HIN to turn on the first switching element S1 from the shutdown circuit 139, the current to turn on the first switching element S1 may be provided to the gate terminal of the first switching element S1 through the protection circuit resistance Rpt, the bootstrap capacitor Cboot, the first source driver 155a, and the first resistance R1 sequentially by the voltage with which the bootstrap capacitor Cboot is charged.

As a result, the first switching element S1 may be turned on.

In some implementations, the voltage with which the bootstrap capacitor Cboot is charged may be the voltage received from the external power supply 250.

If the first switching element S1 is turned on when the first and second switching elements S1 and S2 are turned off as described above, a resistance value for the current flowing through the protection circuit 200 may include a composite resistance value of the first resistance R1 and the protection circuit resistance Rpt.

That is, the composite resistance value may correspond to a value of resistance present through the path along which the current is provided to the gate terminal of the first switching element S1.

In some implementations, the pulse signals HIN and LIN provided to the first and second sub-gate drivers 155 and 160 from the shutdown circuit 139 are complementary to each other. Accordingly, when the pulse signal HIN provided to the first sub-gate driver 155 indicates the turn-on of the first switching element S1, the pulse signal LIN provided to the second sub-gate driver 160 may indicate the turn-off of the second switching element S2.

When the first switching element S1 is turned on and the second switching element S2 is turned off through the above process, the working coil WC is charged with the resonance current provided by the first switching element S1.

That is, the DC link capacitor 113, the working coil WC, and the first switching element S1 form a closed section as the first switching element S1 is turned on. The working coil WC may be charged with the resonance current by the voltage of the DC link capacitor 113.

Figure 13:
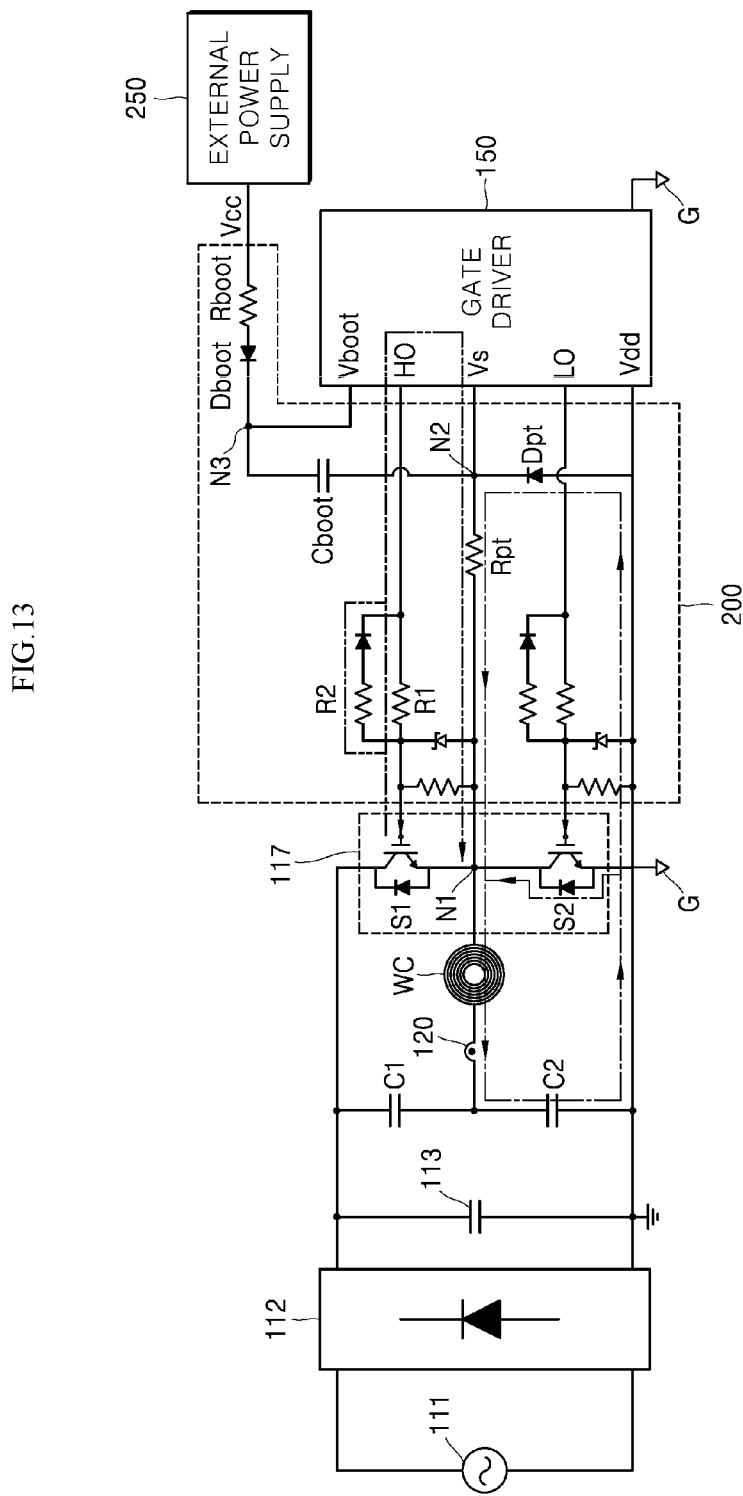

FIGS. 11 and 13 show current flow generated when the first switching element S1 is turned off while the first switching element S1 is turned on and the second switching element S2 is turned off. For instance, the first switching element S1 is being turned off from a state in which the first switching element S1 was turned on and the second switching element S2 was turned off.

Specifically, when the first sub-gate driver 155 receives the pulse signal HIN to turn off the first switching element S1 from the shutdown circuit 139, the current on the protection circuit 200 may flow into a direction of a ground G through the first and second resistors R1 and R2, the first sink driver 155b and the protection circuit resistance Rpt sequentially. That is, the current on the protection circuit 200 may flow from the gate terminal of the first switching element S1 into the outside through the ground D through the first sink driver 155b and the first node N1.

If the first switching element S1 is turned off when the first switching element S1 is turned on and the second switching element S2 is turned off, the resistance value for the current flowing through the protection circuit 200 may include the composite resistance value of the composite resistance having the first and second resistance R1 and R2 and the protection circuit resistance Rpt.

For example, the composite resistance value may correspond to a value of resistance present through the path where the current flows from the gate terminal of the first switching element S1 to the first node N1. If the first switching element S1 is turned off when the first switching element S1 is turned on and the second switching element S2 is turned off through this process, freewheeling current may occur by a counter electromotive force generated by the working coil WC.

That is, when the first switching element S1 is turned off, a counter electromotive force is generated by the working coil WC, and freewheeling current is generated by the counter electromotive force.

Accordingly, a part of the freewheeling current may flows through a first section including the working coil WC and the diode (that is, a freewheeling diode) of the second switching element S2 (that is, a section including the working coil WC, the diode of the second switching element S2, and the second capacitor C2) and the remaining part of the freewheeling current flows through a second section including the protection circuit resistance Rpt and the protection circuit diode Dpt.

Figure 1:
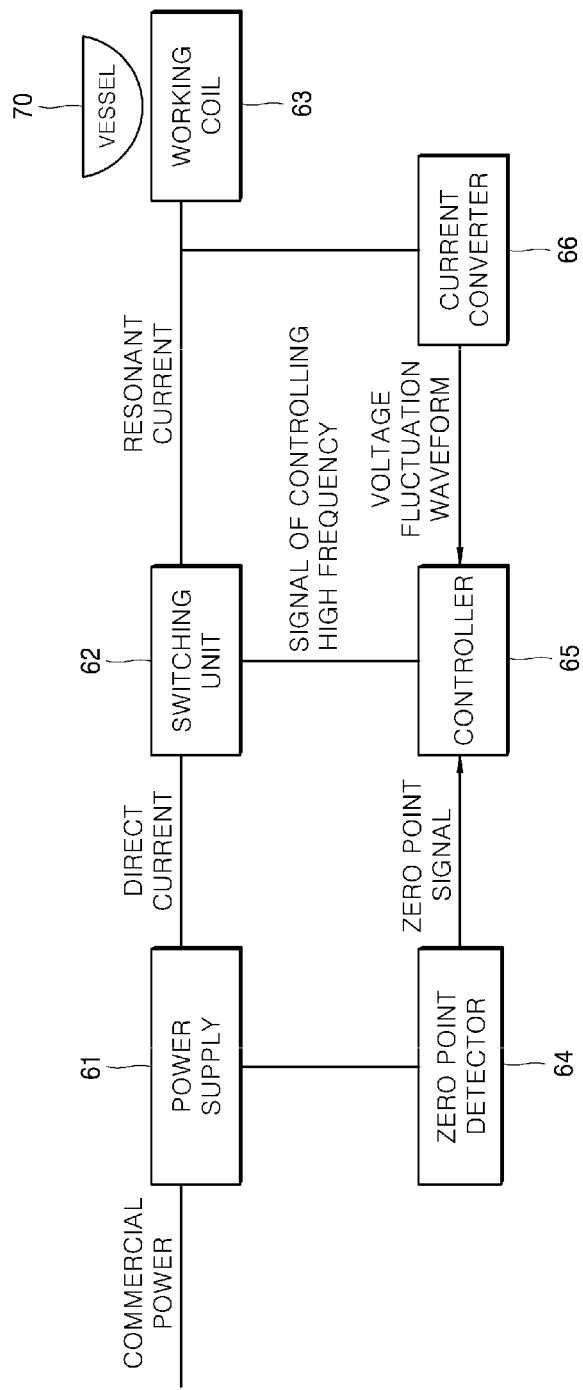
FIG. 1 is a schematic view of an example induction heating device in the related art.
Figure 2:
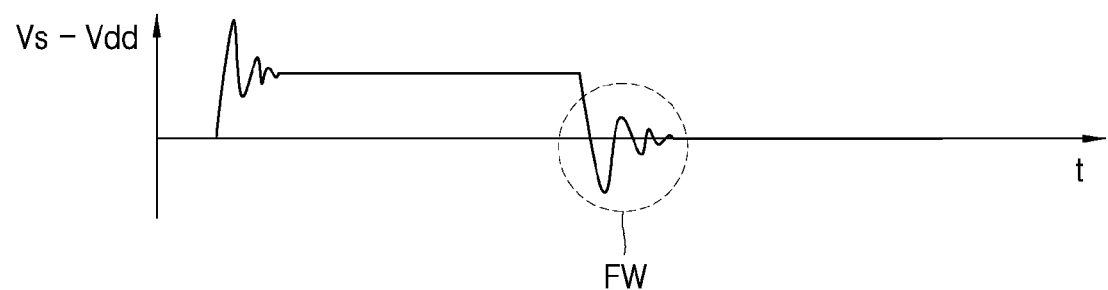
FIG. 2 is a graph of an example of a voltage change in response to switching of a switching unit provided in an induction heating device in the related art.

That is, when the entire freewheeling current flows only through the first section, negative voltage is applied to the reference voltage terminal Vs of the gate driver 150 as shown in FIG. 2, so that the gate driver 150 may be damaged and malfunction of the gate driver 150 may occur.

However, as shown in FIG. 13, when only a part of the freewheeling current flows through the first section and the remaining part of the freewheeling current flows through the second section, small amount of negative voltage is applied to the reference voltage terminal Vs of the gate driver 150, thereby minimizing loss of the gate driver 150.

That is, the magnitude of the negative voltage applied between the first node N1 and the ground G by the freewheeling current may be greater than the magnitude of the negative voltage applied between the reference voltage terminal Vs and the ground G by the freewheeling current.

Figure 14:
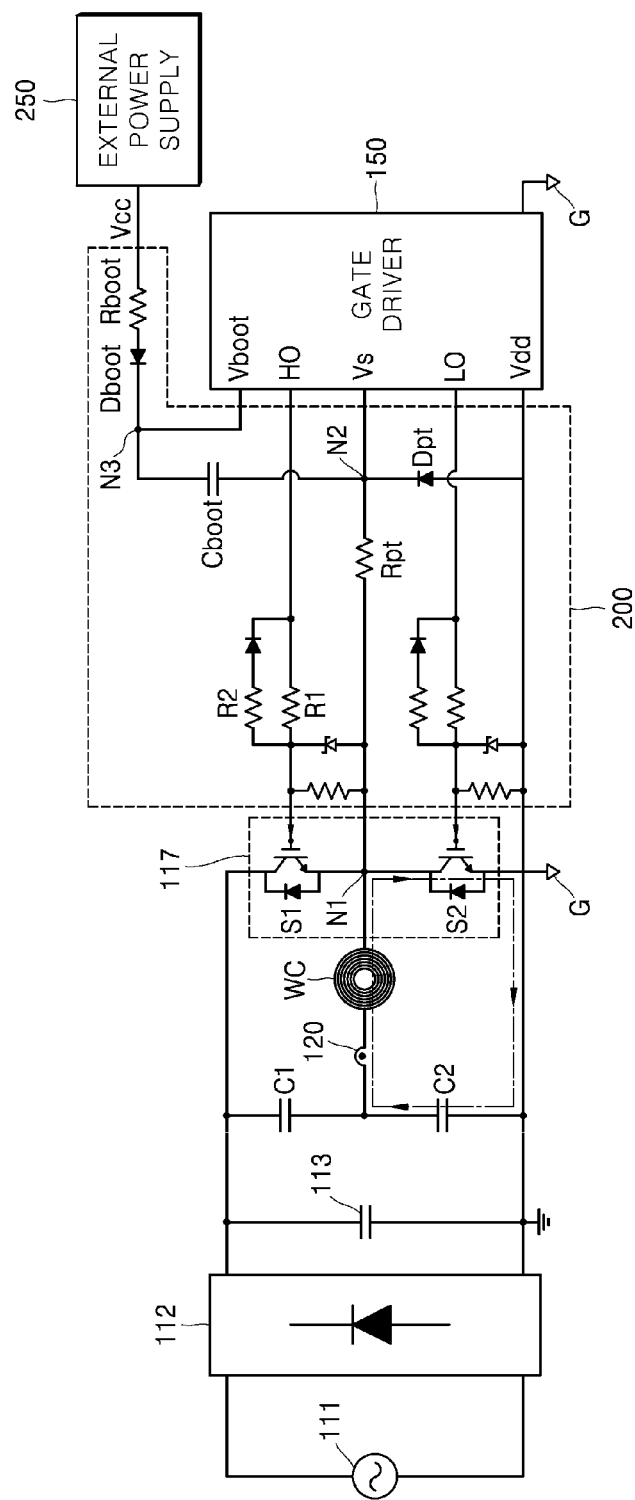

Then, FIGS. 11 and 14 show that current flow generated when the second switching element S2 is turned on with the first and second switching elements S1 and S2 turned off. For instance, the second switching element S2 is being turned on from a state in which the first switching element S1 and the second switching element S2 were turned off.

Specifically, when the second sub-gate driver 160 receives the pulse signal LIN to turn on the second switching element S2 from the shutdown circuit 139, the resonance current with which the working coil WC is charged freely resonates and flows through a closed section including the working coil WC and the second switching element S2 (that is, a closed section including the working coil WC, the second switching element S2, and the second capacitor C2).

That is, after the closed section is formed, the working coil WC exchanges the energy with the capacitor C2, and the resonant current freely resonates and flows through the closed section.

In some implementations, when the object is not present on the working coil WC, the amplitude of the resonant current may be reduced by the resistance of the working coil WC.

When the object is present on the working coil WC, the amplitude of the resonant current may be reduced by the resistance of the working coil WC and the resistance of the object (that is, the amplitude of the resonance current generated when the object is present on the working coil WC is greatly reduced compared to the case where the object is not present on the working coil WC).

That is, a degree in which the amplitude of the resonance current is reduced may vary depending on the presence or the absence of the object, and the presence or the absence of the object may be detected based on the degree in which the amplitude of the resonance current is reduced.

Figure 15:
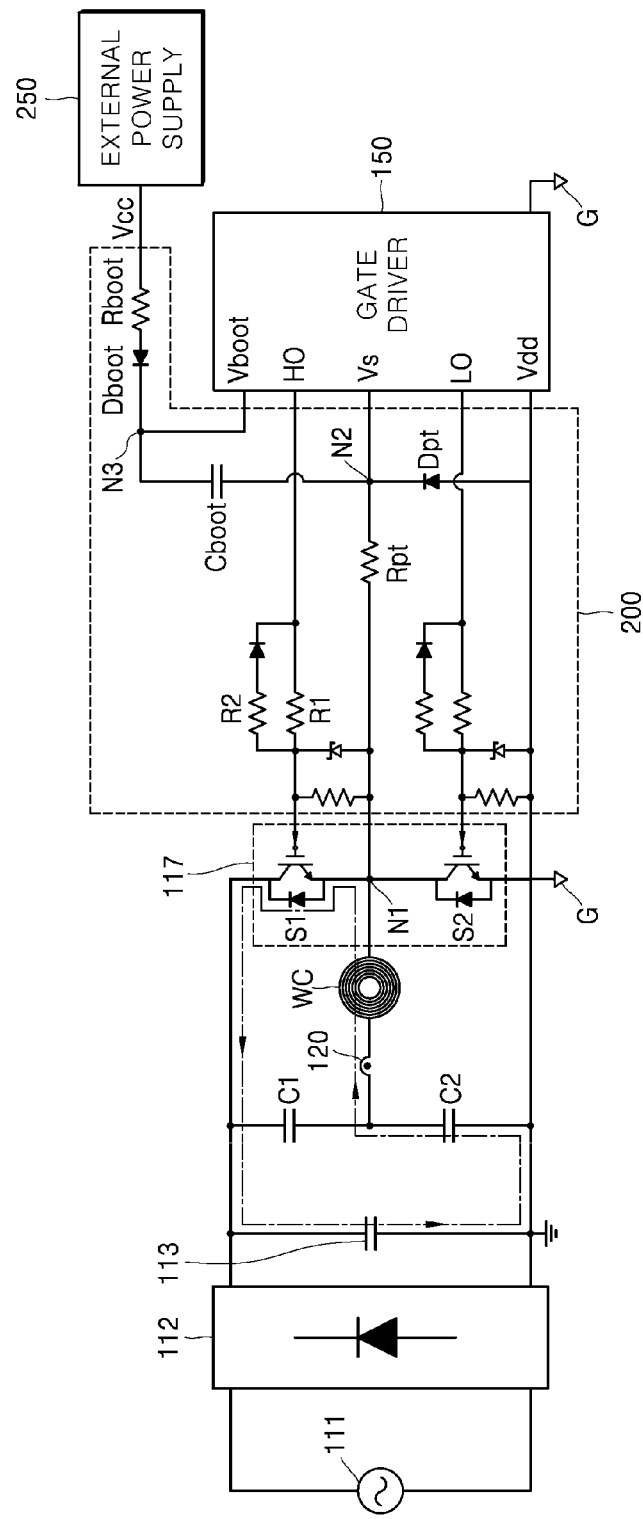

FIGS. 11 and 15 show a current flow generated when the second switching element S2 is turned off with the first switching element S1 turned off and the second switching element S2 turned on.

Specifically, when the second sub-gate driver 160 receives the pulse signal LIN to turn off the second switching element S2 from the shutdown circuit 139, the DC link capacitor 113, the working coil WC and the diode of the first switching element S1 form a closed section, and the current flows through the closed section as shown in FIG. 15.

In some implementations, when the first switching element S1 is turned off, the current flows through a diode of the first switching element S1.

As described above, according to the implementation of the present disclosure, the induction heating device 100 may operate at low power consumption compared to the induction heating device in the related art by improving the function for detecting the vessel, and may have a quick response characteristic to prevent waste of power consumption and to improve user satisfaction. In addition, according to the implementation of the present disclosure, the induction heating device 100 may accurately detect the vessel regardless of the changes in the input voltage, and may prevent the overcurrent from flowing through the induction heating device when the function for detecting the vessel is performed, thereby preventing the noise caused by the overcurrent from generated.

In addition, according to the implementation of the present disclosure, the induction heating device 100 may enable controlling the switching element in real time and may have the improved function for the negative voltage protection without the insulating gate driver or a separate insulating element, thereby reducing the development cost of the induction heating device 100 and having the ease of design of the induction heating device 100.

While the present disclosure has been described with reference to exemplary drawings thereof, it is to be understood that the present disclosure is not limited to the implementations and the drawings in the present disclosure, and various changes can be made by the skilled person in the art within the scope of the technical idea of the present disclosure. Although the working effects obtained from the configurations of the present disclosure is not explicitly described while describing the implementations of the present disclosure, effects predictable by the configurations has also to be recognized.

What is claimed is:

1. An induction heating device, comprising:
    a working coil;
    an inverter comprising a first switching element and a second switching element that are configured to perform a switching operation to thereby apply resonant current to the working coil;
    a gate driver comprising a first sub-gate driver and a second sub-gate driver that are configured to be driven based on a drive voltage received from an external power supply, that are connected to the inverter, and that are configured to control the switching operation, the first sub-gate driver and the second sub-gate driver being configured to turn on and turn off the first switching element and the second switching element, respectively; and
    a protection circuit disposed between the inverter and the gate driver, the protection circuit comprising:
        a first resistor disposed between a gate terminal of the first switching element and an output terminal of the first sub-gate driver,
        a second resistor connected electrically in parallel to the first resistor,
        a protection circuit resistor disposed between a reference voltage terminal of the first sub-gate driver and a first node between the first switching element and the second switching element,
        a protection circuit diode disposed between a ground and a second node between the protection circuit resistance and the reference voltage terminal, and
        a bootstrap circuit disposed between the second node and the external power supply.

2. The induction heating device of claim 1, wherein the first sub-gate driver comprises a first source driver and a first sink driver,
    wherein the second sub-gate driver comprises a second source driver and a second sink driver,
    wherein the bootstrap circuit comprises a bootstrap capacitor connected to the second node, a bootstrap diode, and a bootstrap resistor, wherein the bootstrap diode and the bootstrap resistor are disposed between the bootstrap capacitor and the external power supply, and
    wherein the first source driver is connected to a third node between the bootstrap capacitor and the bootstrap diode.

3. The induction heating device of claim 2, wherein the gate terminal of the first switching element is configured to, based on the bootstrap capacitor being charged by the drive voltage, receive current to turn on the first switching element through the protection circuit resistor, the bootstrap capacitor, the first source driver, and the first resistor in series.

4. The induction heating device of claim 2, wherein the protection circuit is configured to, based on the first switching element being turned on from a state in which the first switching element and the second switching element were turned off, allow current to flow through a composite resistance determined based on resistance values of the first resistor and the protection circuit resistor.

5. The induction heating device of claim 2, wherein the protection circuit is configured to, based on the first switching element being turned off from a state in which the first switching element was turned on and the second switching element was turned off, allow current to flow to the ground through the first resistor, the second resistor, the first sink driver, and the protection circuit resistor in series.

6. The induction heating device of claim 2, wherein the protection circuit is configured to, based on the first switching element being turned off from a state in which the first switching element was turned on and the second switching element was turned off, allow current to flow through a composite resistance determined based on resistance values of the first resistor, the second resistor, and the protection circuit resistor.

7. The induction heating device of claim 2, wherein the working coil is configured to, based on the first switching element being turned on from a state in which the first switching element and the second switching element were turned off, be charged with resonance current applied by the first switching element.

8. The induction heating device of claim 7, wherein the working coil is configured to, based on the first switching element being turned off from a state in which the first switching element was turned on and the second switching element was turned on, generate a freewheeling current by a counter electromotive force,
    wherein the freewheeling current comprises:
        a first portion that flows through a first circuit section comprising the working coil and a diode of the second switching element, and
        a second portion that flows through a second circuit section comprising the protection circuit resistor and the protection circuit diode.

9. The induction heating device of claim 8, wherein a magnitude of a negative voltage applied between the first node and the ground by the freewheeling current is greater than a magnitude of a negative voltage applied between the reference voltage terminal and the ground by the freewheeling current.

10. The induction heating device of claim 8, wherein the working coil is configured to, based on the second switching element being turned on from a state in which the first switching element and the second switching element were turned off, be changed by resonance current that freely resonates and flows through a closed circuit section comprising the working coil and the second switching element.

11. The induction heating device of claim 1, further comprising:
    a sensor configured to measure a value of current in the working coil;
    a vessel detector configured to:
        convert a first current value into a first voltage value, the first current value being measured before a resonance of the current in the working coil, compare the first voltage value to a predetermined resonance reference value, control the gate driver to charge the working coil with energy having a predetermined magnitude, convert a second current value into a second voltage value, the second current value being measured after the resonance of the current in the working coil, and compare the second voltage value to a predetermined count reference value to generate an output pulse; and a controller configured to receive the output pulse from the vessel detector and to determine whether a cooking vessel is present on the working coil based on the output pulse received from the vessel detector.

12. The induction heating device of claim 11, wherein the vessel detector comprises:

a resonance current converter configured to convert the value of the current in the working coil measured by the sensor into a voltage value;

a shutdown comparator configured to compare the first voltage value to the predetermined resonance reference value to generate an output signal;

a latch circuit configured to maintain an activation state of the output signal for a predetermined duration;

a count comparator configured to compare the second voltage value to the predetermined count reference value to generate the output pulse; and a shutdown circuit configured to control the gate driver based on the output signal.

13. The induction heating device of claim 12, wherein the resonance current converter has a first end connected to the working coil, a second end connected to the shutdown comparator, and a third end connected to the controller.

14. The induction heating device of claim 1, wherein each of the first switching element and the second switching element comprises an insulated gate bipolar transistor.

15. The induction heating device of claim 1, wherein one end of the working coil is connected to the first node between the first switching element and the second switching element.

16. The induction heating device of claim 1, wherein the protection circuit resistor is disposed between and connected to the first node and the second node.

17. The induction heating device of claim 1, wherein the second resistor includes:

a first end connected to a node between the first resistor and the output terminal of the gate driver; and a second end connected to a node between the first node and the protection circuit resistor.

18. The induction heating device of claim 2, wherein the bootstrap resistor is disposed between and connected to the bootstrap diode and the external power supply.

19. The induction heating device of claim 2, wherein the output terminal of the first sub-gate driver is connected to a node between the first source driver and the first sink driver.

20. The induction heating device of claim 2, wherein the first sink driver is connected to the reference voltage terminal of the first sub-gate driver.

\* \* \* \* \*